(No Model.)
A. J. VOLLRATH.
HANDLE FOR COFFEE OR TEA POTS, &c.
No. 532,504. Patented Jan. 15, 1895.
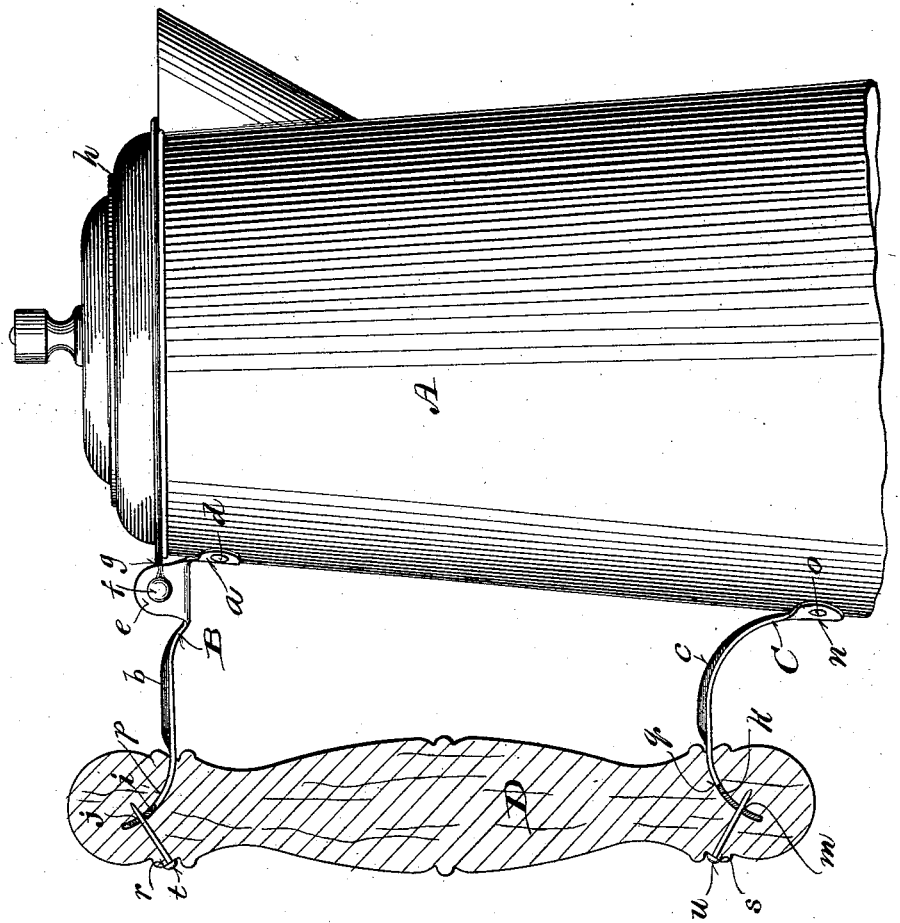

UNITED STATES PATENT OFFICE.

ANDREW J. VOLLRATH, OF SHEBOYGAN, WISCONSIN.

HANDLE FOR COFFEE OR TEA POTS, &c.

SPECIFICATION forming part of Letters Patent No. 532,504, dated January 15, 1895.

Application filed October 29, 1894. Serial No. 527,274. (No model.)

*To all whom it may concern:*

Be it known that I, ANDREW J. VOLLRATH, a citizen of the United States, and a resident of Sheboygan, in the county of Sheboygan and State of Wisconsin, have invented certain new and useful Improvements in Handles for Coffee or Tea Pots or Analogous Vessels; and I do hereby declare that the following is a full, clear, and exact description thereof.

My invention relates to handles for coffee and tea pots and analogous vessels, and consists in certain peculiarities of construction and combination of parts, as will be fully set forth hereinafter and subsequently claimed.

The drawing is a central vertical section through my improved device, showing the same attached to a coffee-pot, or analogous vessel.

A represents a portion of a vessel of the kind employed in preparing coffee and tea for use as beverages, and my present invention is especially adapted for use in connection with that class of pots known as enameled ware, as this class of goods requires a different style of handle attachment from ordinary sheet-metal pots on which a plain metal handle can be readily soldered, such method of attaching the handles being impracticable with enameled ware.

B, C, represent, respectively, the upper and lower attaching pieces, both formed from flat sheet metal blanks pressed or struck up by dies into the required shape shown in the drawing, both being preferably rounded or curved, both longitudinally and laterally intermediate of their ends, as shown at *b*, *c*, respectively, the object of this being to stiffen and strengthen said attaching pieces and to prevent the said pieces B C, from sagging or dropping down out of line, while the pot A, with these pieces attached, is being fired during the enameling process. One end of the piece B is bent downward, as shown at *a*, and curved laterally to correspond to the contour of the pot A, and may further be provided with suitable holes registering with like holes through the body of the pot A, for the passage therethrough of rivets *d* by which it is secured to said pot body. Intermediate between this end *a* and the described rounded or curved portion of the piece B, side extensions of the described metal blank are bent up to form attaching ears *e*, which are provided with holes for the reception of the pintle or pivot pin *f* of the hinge *g*, which, in turn, is secured to the lid, *h*, of the pot, in any preferred manner. The other end of the piece B, beyond the described rounded or curved portion *b*, is curved upward as shown at *i*, and preferably provided with a hole therethrough, at the point *j*, for attachment to the handle D, as hereinafter described.

The lower attaching piece, C, is of practically corresponding construction with that of the piece B, just described, except that obviously the hinge-ears of the upper piece are omitted in the lower piece, and the extreme end of the piece C, farthest from the vessel A, is preferably curved downward, as shown at *k*, instead of upward, said end having preferably a hole therethrough, at the point *m*, and at its other end, the piece C has a downturned laterally curved end *n* corresponding to the contour of the vessel A at this point, and preferably provided with holes registering with corresponding holes through the body of the vessel A for attachment thereto by means of rivets *o*.

The handle D is made in one piece, and preferably of wood or other suitable non-heat-conducting material, and is provided, adjacent to each end, with a curved transverse kerf, corresponding in shape and size to the curved outer ends *i*, *k*, of the attaching pieces B C, the upper kerf, *p*, curving upward, and the lower kerf, *q*, curving downward, in the illustration given. The exterior of said handle D is preferably provided, on its surface farthest from the attached vessel, with shouldered or squared off portions, *r*, *s*, formed at angles to the longitudinal line of said handle, to serve as guides in driving the nails, tacks, or analogous fastening devices, *t*, *u* whereby the handle and its attaching pieces are secured together, said nails being thereby properly directed, so that their points will pass through the holes *j*, *m*, in the ends *i*, *k*, of the pieces B, C, when said pieces are provided with holes. When the said pieces B C are formed of comparatively thin sheet metal, it may not be necessary to form the holes *j*, *m*, therein, but it is usually better to do this, and when the guiding places *r s* are formed, as described, upon the exterior of the handle D it will not be necessary to form any bore whatever in the said handle to serve as a guide for the said nails.

By the hereinbefore described construction, I form an exceedingly economical and efficient handle of the class described, and one that can be very readily and quickly made and secured to place upon the attaching pieces, and which will effectually guard against the danger of the pot, with its hot contents when in use, ever coming into contact with the hand of the user, besides which I obviate the trouble and expense of boring longitudinal holes through the handle, and the cost and trouble of making and fitting pivotal pins therein, as in many non-heat-conducting handles now in common use.

Having thus described my invention, what I claim as new, and desire to secure by Letters Patent, is—

1. A handle for coffee and tea pots and analogous vessels, comprising suitable attaching pieces formed from sheet-metal secured to the vessel body and projecting therefrom and rounded or curved longitudinally at their outer ends, a handle-piece provided with correspondingly rounded or curved transverse kerfs therein adjacent to each end thereof, and nails, tacks or analogous fastening devices driven from the exterior surface of said handle-piece through said rounded or curved ends of said attaching pieces, substantially as set forth.

2. A handle for coffee and tea pots and analogous vessels, comprising suitable attaching pieces formed from sheet-metal secured to the vessel body and projecting therefrom and having rounded or longitudinally curved perforated outer ends, a handle-piece of suitable non-heat-conducting material provided with correspondingly rounded or curved transverse kerfs therein adjacent to each end thereof and angularly disposed shoulders or squared guiding portions formed on the exterior surface of said handle piece, and nails, tacks or analogous fastening devices driven into said handle-piece from said guiding portions of its surface through and beyond the perforations in the said ends of said attaching pieces, substantially as set forth.

In testimony that I claim the foregoing I have hereunto set my hand, at Milwaukee, in the county of Milwaukee and State of Wisconsin, in the presence of two witnesses.

ANDREW J. VOLLRATH.

Witnesses:
N. E. OLIPHANT,
H. G. UNDERWOOD.